US010111031B2

United States Patent
Blowers et al.

(10) Patent No.: US 10,111,031 B2
(45) Date of Patent: Oct. 23, 2018

(54) OBJECT DETECTION AND TRACKING SYSTEM

(71) Applicant: THE UNITED STATES OF AMERICA AS REPRESETNED BY THE SECRETARY OF THE AIR FORCE, Washington, DC (US)

(72) Inventors: Misty Blowers, Minoa, NY (US); Baek-Young Choi, Overland Park, KS (US); Sejun Song, Overland Park, KS (US); Jonathan Williams, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/003,899

(22) Filed: Jan. 22, 2016

(65) Prior Publication Data

US 2017/0215034 A1   Jul. 27, 2017

(51) Int. Cl.
| | |
|---|---|
| *H04W 24/00* | (2009.01) |
| *H04W 4/021* | (2018.01) |
| *H04W 8/00* | (2009.01) |
| *H04W 4/06* | (2009.01) |
| *H04L 29/06* | (2006.01) |
| *H04W 84/12* | (2009.01) |

(52) U.S. Cl.
CPC ............. *H04W 4/021* (2013.01); *H04L 67/42* (2013.01); *H04W 4/06* (2013.01); *H04W 8/005* (2013.01); *H04W 84/12* (2013.01)

(58) Field of Classification Search
CPC ..... H04W 4/02; H04W 4/025; H04W 64/006; H04W 88/02
USPC ........ 455/457, 41.2, 456, 404.2, 456.1, 567, 455/406, 407
See application file for complete search history.

(56) References Cited

U.S. PATENT DOCUMENTS

| | | | | |
|---|---|---|---|---|
| 9,204,257 | B1* | 12/2015 | Mendelson | G08G 1/14 |
| 2006/0265123 | A1* | 11/2006 | Chon | G01C 21/30 |
| | | | | 701/533 |
| 2011/0050732 | A1* | 3/2011 | Arrasvuori | G06F 17/30241 |
| | | | | 345/666 |
| 2012/0135751 | A1* | 5/2012 | Mishra | H04W 4/029 |
| | | | | 455/456.1 |
| 2012/0136865 | A1* | 5/2012 | Blom | G06F 17/30141 |
| | | | | 707/739 |
| 2013/0036175 | A1* | 2/2013 | Lau | G08B 27/001 |
| | | | | 709/206 |
| 2014/0289607 | A1* | 9/2014 | Ko | G06F 17/30873 |
| | | | | 715/234 |

(Continued)

*Primary Examiner* — Joseph Arevalo
(74) *Attorney, Agent, or Firm* — Joseph A. Mancini (57) ABSTRACT

A system and method for automated crowd sensing object detection. The invention senses a missing object's presence in proximity which is conducted using a smartphone, with a software application running in the background that opportunistically collects and reports the data without the active involvement of the user. A small tag is attached to a tracked object or worn by a person who does not carry a smartphone (i.e., a young child), and emits a secure wireless signal periodically for geo-fencing and geo-tracking by caregivers. The information is sent to a cloud server so that the commander may be able to confirm the whereabouts of the tagged object or person in this case.

4 Claims, 11 Drawing Sheets

(56) References Cited

U.S. PATENT DOCUMENTS

| | | | | |
|---|---|---|---|---|
| 2014/0370921 A1* | 12/2014 | Scozzaro | ................ | G01S 1/68 |
| | | | | 455/457 |
| 2015/0193768 A1* | 7/2015 | Douglas | ............ | G06Q 20/4016 |
| | | | | 705/44 |
| 2015/0193775 A1* | 7/2015 | Douglas | ............ | G06Q 30/0253 |
| | | | | 705/14.23 |

* cited by examiner

OBJECT DETECTION AND TRACKING SYSTEM

STATEMENT OF GOVERNMENT INTEREST

The invention described herein may be manufactured and used by or for the Government for governmental purposes.

BACKGROUND OF THE INVENTION

The need for detecting and tracking important objects in near real time are presented in many military and civilian domains. A military case would be tracking a high value object or a person of a target, either ally or enemy. A civilian and national priority example might be child protection and tracking. Keeping track of a child or a mobile object is often a difficult task for a parent or a single guardian.

If it were possible to exploit a community and pervasive smartphones for object or child tracking, for example by a tracking system in which a monitored object(s) or person/child emit a wireless signal via a small tag, where that wireless signal could be captured by a mobile communications device, there would exist several technical issues hindering its practical deployment such as privacy and security, and energy efficiency.

The sensing paradigm of using mobile devices carried by humans for a collaborative objective is called Mobile Crowd Sensing (MCS) [1] or People-Centric Sensing [2], and received recent attention from academia [3, 4, 5, 6, 7, 8, 9, 10, 11, 12, 13, 14]. However, while several efforts have been made to improve specific techniques for MCS, ranging from incentive schemes [15], a programming framework for MCS applications [4], and a deployment model [7] to energy efficiency [6], thus far, there have been few actual deployments of MCS for real-world public sector applications of a national priority. To become a really effective technology, MCS still has to overcome the major challenges of privacy, security, sensing effectiveness, and user resource utilization. To the best of our knowledge, the particular privacy issue of MCS has not been technically addressed before. There are a number of commercial devices available for child tracking [16, 17, 18, 19]. However, most of them are expensive and fundamentally rely on GPS that is not available in-doors nor is it energy-efficient. Furthermore, these proposed methods use cellular communication for one-to-one communication rather than a crowd sensing application. Thus these methods incur monthly-charges and the efficacy of that form of monitoring is limited compared to crowd sensing.

OBJECTS AND SUMMARY OF THE INVENTION

It is therefore an object of the present invention to provide an object tracking system and method utilizing personal communications devices in a crowd-sensing fashion.

It is another object of the present invention to provide an object tracking system and method that features certain elements of an Amber Alert system such as centralized control and alert messaging.

It is another object of the present invention to provide an object tracking system and method utilizing smartphone applications that require minimal user involvement.

It is yet another object of the present invention to provide an object tracking system and method which utilizes a modified WiFi signal for faster object location.

It is yet still another object of the present invention to additionally provide an object tracking system and method which locates objects of interest and geo-fences objects of interest.

Briefly stated, the present invention provides an automated crowd sensing system for object detection which radically improves the effectiveness through opportunistic crowd sensing (OCS) using advancement in wireless communication and sophisticated security mechanisms. The invention senses a missing object's presence in proximity which is conducted using a smartphone, with a software application running in the background that opportunistically collects and reports the data without the active involvement of the user. A small tag is attached to a tracked object or worn by a person who does not carry a smartphone (i.e., a young child), and emits a secure wireless signal periodically for geo-fencing and geo-tracking by caregivers. The information is sent to a cloud server so that the commander may be able to confirm the whereabouts of the tagged object or person in this case. When an object or person goes missing, a main commander or a parent can issue an alert that will, in turn, inform volunteers to monitor signals from the missing object or a person.

REFERENCES

[1] R. K. Ganti, F. Ye, and H. Lei, "Mobile Crowdsensing: Current State and Future Challenges," IEEE Communications Magazine, vol. 49, no. 11, pp. 32-39, 2011.
11
[2] A. T. Campbell, N. D. Lane, E. Miluzzo, R. A. Peterson. H. Lu, X. Zheng, M. Musolesi, K. Fodor, S. B. Eisenman, and G.-S. Ahn, "The Rise of People-Centric Sensing," IEEE Internet Computing.
[3] D. Yang, G. Xue, X. Fang, and J. Tang, "Crowdsourcing to Smartphones: Incentive Mechanism Design for Mobile Phone Sensing," in Proceedings of the 18th Annual International Conference on Mobile Computing and Networking (Mobicom). ACM, 2012, pp. 173-184.
[4] M.-R. Ra, B. Liu, T. L. Porta, and R. Govindan, "Medusa: A Programming Framework for Crowd-sensing Applications," in Proceedings of the 10th International Conference on Mobile Systems, Applications, and Services (MobiSys). ACM, 2012, pp. 337-350.
[5] M. Talasila, R. Curtmola, and C. Borcea, "Improving Location Reliability in Crowd Sensed Data with Minimal Efforts," in Wireless and Mobile Networking Conference (WMNC), April 2013, pp. 1-8.
[6] N. D. Lane. Y. Chon, L. Zhou, Y. Zhang, F. Li, D. Kim, G. Ding, F. Zhao, and H. Cha. "Piggyback CrowdSensing (PCS): Energy Efficient Crowdsourcing of Mobile Sensor Data by Exploiting Smartphone App Opportunities," in Proceedings of the 11th ACM Conference on Embedded Networked Sensor Systems (SenSys). ACM, 2013, pp. 1-14.
[7] Y. Xiao, P. Simoens, P. Pillai. K. Ha, and M. Satyanarayanan, "Lowering the Barriers to Large-scale Mobile Crowdsensing," in Proceedings of the 14th Workshop on Mobile Computing Systems and Applications (HotMobile). ACM, 2013, pp. 1-6.
[8] A. Farshad, M. K. Marina, and F. Garcia, "Urban WiFi characterization via mobile crowdsensing," in IEEE Network Operations and Management Symposium (NOMS), May 2014, pp. 1-9.
[9] G. Cardone, A. Cirri, A. Corradi, and L. Foschini, "The participant mobile crowd sensing libing lab: The testbed for smart cities," IEEE Communications Magazine, vol. 52, no. 10, pp. 78-85, October 2014.
[10] B. Guo, Z. Yu. D. Zhang, and X. Zhou, "From Participatory Sensing to Mobile Crowd Sensing," in IEEE PerCom Workshops (SCI), 2014.
[11] D. Zhao, X.-Y. Li, and H. Ma, "How to Crowdsource Tasks Truthfully Without Sacrificing Utility: Online Incentive Mechanisms with Budget Constraint," in Proc. of IEEE INFOCOM, 2014, pp. 1213-1221.
12
[12] H. Ma, D. Zhao, and P. Yuan, "Opportunities in mobile crowd sensing," Communications Magazine, IEEE, vol. 52, no. 8, pp. 29-35, August 2014.
[13] D. Zhang, L. Wang, H. Xiong, and B. Guo, "4W1H in mobile crowd sensing," Communications Magazine, IEEE, vol. 52, no. 8, pp. 42-48, August 2014.
[14] C. Xu, S. Li, Y. Zhang. E. Miluzzo, and Y. farn Chen, "Crowdsensing the speaker count in the wild: implications and applications," Communications Magazine, IEEE, vol. 52, no. 10, pp. 92-99, October 2014.
[15] G. Cardone, A. Corradi, L. Foschini, and R. Montanari, "Socio-Technical Awareness to Support Recommendation and Efficient Delivery of IMS Enabled Mobile Services," IEEE Communication Magazine, vol. 50, no. 6, pp. 82{90, 2012.
[16] "Filip Technologies, Inc." http://www.my_lip.com.
[17] "Location Based Technologies, Inc." http://www.locationbasedtech.com.
[18] "Amber Alert GPS," http://www.amberalertgps.com.
[19] "Wonder Technology Solutions AB," http://www.trax-family.com.
[20] "BLE," https://developer.bluetooth.org/Technology-Overview/Pages/BLE.aspx.
[21] "ZigBee Alliance," http://zigbee.org.
[22] "Near Field Communication (NFC)," http://www.near_eldcommunication.org/.
[23] "Wi-Fi Direct," http://www.wi-fi.org/discover-wi-fi/wi-fi-direct.
[24] "How fast is Wi-Fi Direct?—Wi-Fi Alliance," http://www.wi-fi.org/knowledge-center/faq/how-fast-is-wi-fi-direct.
[25] R. Chandra, J. Padhye, L. Ravindranath, and A. Wolman, "Beacon-Stuffing: Wi-Fi without Associations," in Eighth IEEE Workshop on Mobile Computing Systems and Applications, HotMobile 2007, 2007, pp. 53-57.
[26] K. Dhondge, S. Song, B.-Y. Choi, and H. Park, "WiFi-Honk: Smartphone based Beacon Stuffed WiFi Car2X-Communication System for Vulnerable Road User Safety," in IEEE 79th Vehicular Technology Conference (VTC), 2014, (Also presented in CANSec Workshop, 2014).
[27] M. Gong, "Analyzing the Beacon Collision Probability in Mesh Networks." https://mentor.ieee.org/802.11/dcn/07/11-07-2813-00-000s-analyzing-the-beacon-collision-probability.ppt.
13
[28] D. Wagner, "A Generalized Birthday Problem." in Advances in Cryptology (CRYPTO), vol. 2442, 2002, pp. 288-304.
[29] "Wireless LAN Medium Access Control (MAC) and Physical Layer (PHY) Specifications," IEEE Standard for Information technology, 1999.

DETAILED DESCRIPTION OF THE PREFERRED EMBODIMENT

Figure 1:
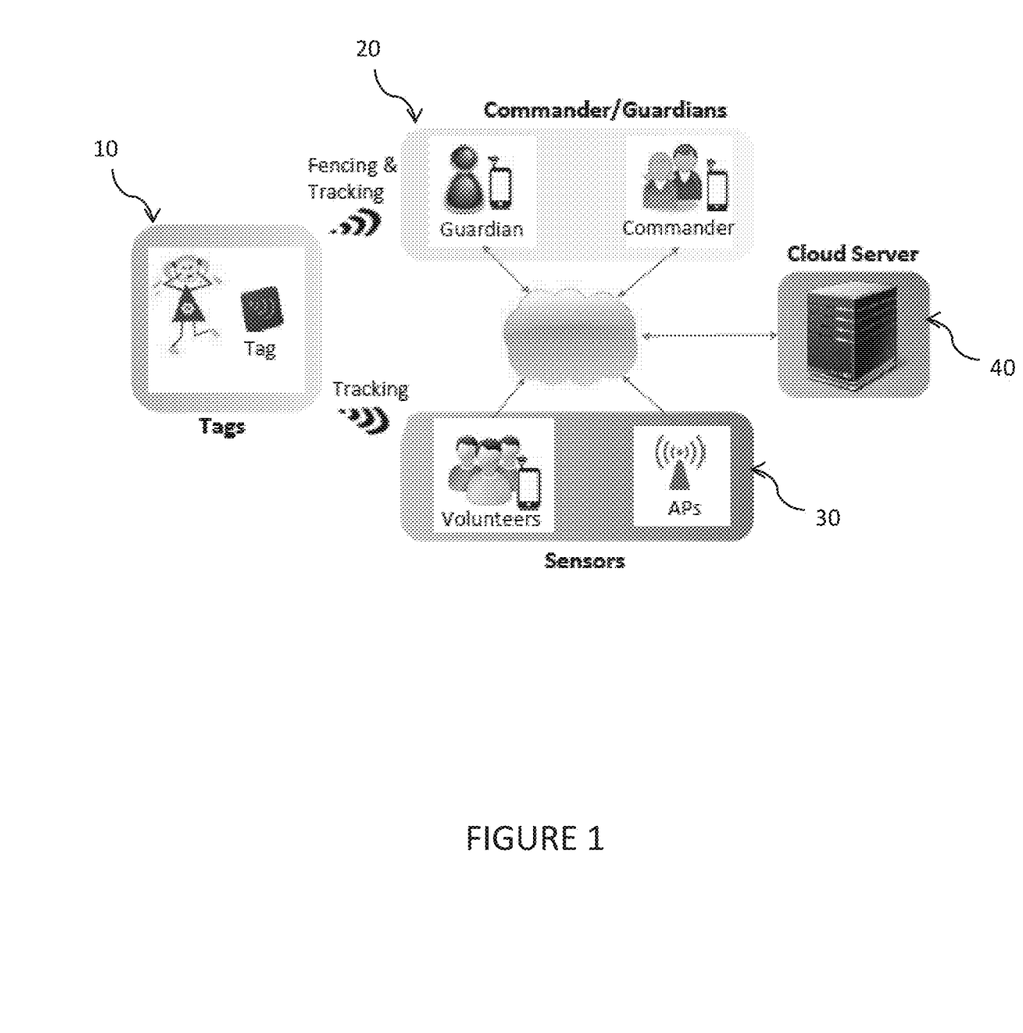
FIG. 1 shows the basic components of the present invention.

The present invention, loosely referred to as a "WiFi Amber system", provides a smart and secure mobile geo-fencing and crowd sensing system for object tracking. The "objects" may be associated with a person of interest. As illustrated in FIG. 1, the proposed WiFi Amber system consists of four main components including a tag 10 (hardware and software), a smartphone application for commanders and guardians 20, an application for sensing volunteers 30 (smartphone application or access point program), and a cloud server 40 for management.

Still referring to FIG. 1, a summary of the present invention is as follows. First, a small tag 10 would be attached to a monitored object or worn by a young child, and emits a secure wireless signal periodically for geo-fencing and geo-tracking by guardians. The affordable tag 10 is based on an advanced device-to-device wireless technology. Then, monitoring an object's presence in proximity is conducted by a smartphone unconsciously to its user (i.e., a delegated tracking agent), as the application (or "app") runs in the background and opportunistically collects and reports the data without active involvement of the user. The information is sent to a cloud server 40 so that the commander or parent 20 (top tracking authority) may be able to confirm the whereabouts of the object. When an object goes missing, a commander 20 can issue an alert that will, in turn, inform volunteers 30 (opportunistic participants of crowd sensing) to monitor signals from the missing object. Components of the present invention include:

Tag: A simple tag 10 that can be affixed easily and discretely to an object that broadcasts a geo-tracking token. An active beacon (periodic beaconing) or a passive beacon (beaconing in response to a probe request) can be created. WiFi communication mechanism is used for broadcasting a beacon signal. WiFi covers longer distance.

Commander/Guardian smartphone app 20: The functionalities of commanders and guardians' app 20 are the same except that commanders can configure the schedule of guardians for monitoring. Guardians can detect the presence of the Tag (Geo-Fencing) and periodically upload its location to a cloud server 40, and the commander's app 20 can access and display the location information. The app also enables the parents to directly monitor their tag-tracked objects 10 (Geo-Fencing). When a tagged object 10 gets lost, the app 20 issues a geo-tracking request via a cloud server 40 and manages the geo-tracking process for the commanders. The terms "commander" and "guardian" will be used functionally synonymously with the smartphone term "apps" that commanders and guardians possess.

Volunteer sensor app 30: The app will be installed in the sensors including WiFi AP infrastructures (i.e., using OpenWrt API) and smartphones of volunteers during the registration. The app will remain in a disabled state most of the time. When a geo-tracking service request is received, the app 30 will be automatically enabled to send probe requests to sense the tagged missing object 10. When a sensor is able to receive a geo-tracking token from a (missing) object's tag 10, it relays its location to the commanders through a cloud server 40. The owners of smartphones do not have to be consciously involved in the search process, and it does not interrupt any original functions of the sensors or smartphones. The term "volunteer" will be used synonymously with the smartphone term "app" that volunteers possess.

Cloud server 40: A cloud server and/or cloud server program interacts with commanders, designated guardians, and sensing volunteers through smartphones. Commanders register their objects' tag, guardians' identification, and the guarding schedule. The cloud server sends updates about the objects' location upon a commander's request. The cloud server receives updates and a missing object report from the guardian and relays the information to the commanders. When a cloud server receives a missing object report, it enables sensors according to the missing object's location and the coverage area. When a missing object has been found, it will be able to disable the sensors.

Figure 2:
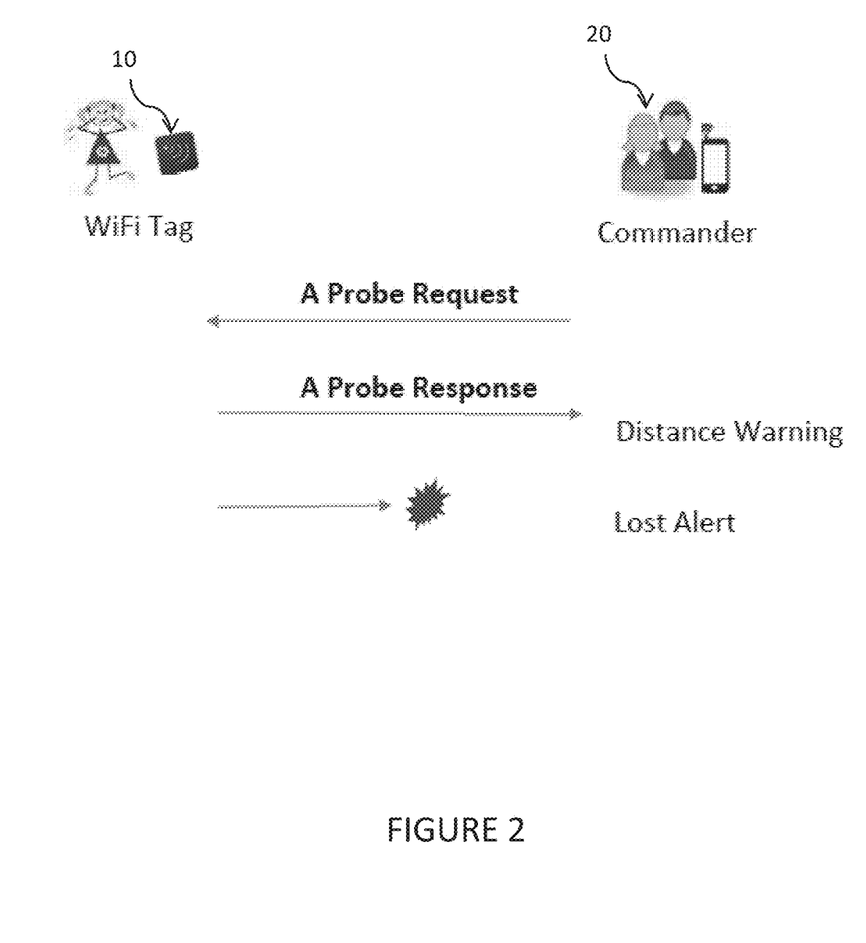
FIG. 2 shows an item's tag in response to a probe request.

The present invention performs a cost-effective monitoring of an object's location, referred to as Geo-Fencing, and crowd sensing of a missing object, referred to as Geo-Tracking. In particular:

Geo-Fencing: Geo-Fencing is a feature of the present invention that keeps an object within a predefined set of boundaries such as in home, in school, or with guardians. As illustrated in FIG. 2, the process starts with the commanders or parents 20. They can directly monitor their tagged object 10 by sending a probe request that triggers a probe response from a child's tag 10. Commanders 20 can also delegate the geo-fencing task to a guardian by configuring the guarding schedule. A guardian monitors a tagged object 10 and periodically updates the geo-fencing status to a cloud server 40 so that commanders can indirectly monitor their objects. When there is no probe response, according to the policy, the commander can conclude an object lost to initiate a geo-tracking request via a cloud server 40.

Figure 3:
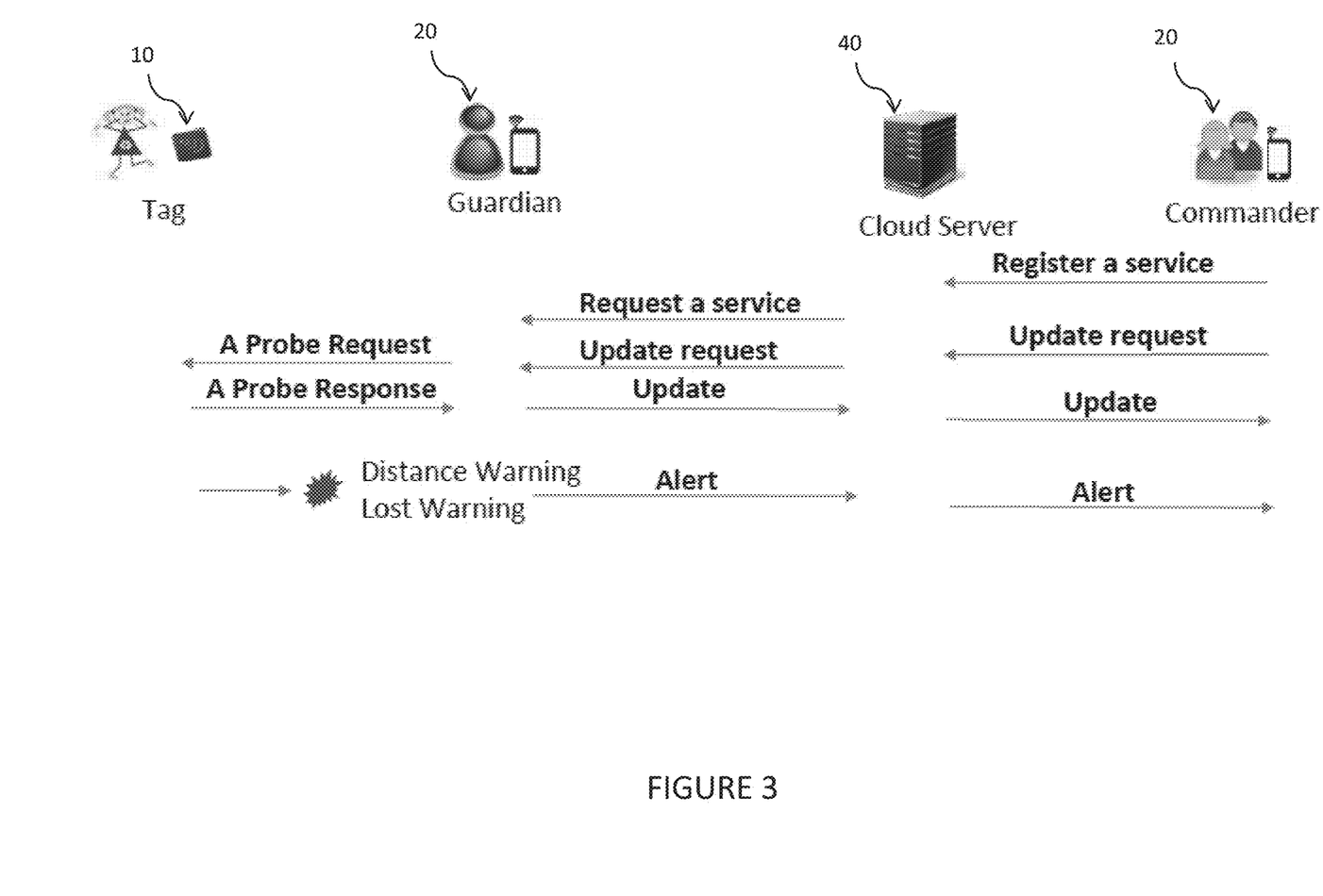
FIG. 3 shows the sequence of events initiated when a missing item is reported to a cloud server.

Geo-Tracking: Geo-Tracking includes an active method to follow the object's location as well as to look for the location of a missing object. As illustrated in FIG. 3, the process starts when commanders report a missing tagged child to a cloud server 40. When a cloud server 40 receives a missing object report, it enables volunteers in the area of the missing tagged object 10 by sending a service request message. When a geo-tracking service request is received by a volunteer, it sends a probe request to trigger a probe response from the missing tagged object 10. When a volunteer receives a probe response from a missing object's tag 10, it relays its location to the commanders. When a missing tagged object 10 has been found, it will be able to disable the sensors.

Crowd sensing is the ability to collect local data by using mobile devices to share for various large scale applications. Using various wireless communication mechanisms including WiFi, BLE [20], Zigbee [21], and Near Field Communication (NFC) [22] in tandem with the increasingly prevalent smartphone users, crowd sensing becomes one of the most promising sensing mechanisms. There are numerous crowd sensing applications [9, 8, 4, 7] for finding a missing object. However, the effectiveness of the crowd sensing doesn't reach its potential due to (1) the limited wireless communication mechanisms in their coverage range and speed as well as (2) its active participation factor in sensing, reporting, and processing methods. Unless there are clear incentives and privacy protection methods for the crowd sensors, it is considered very hard to achieve a practical deployment of it in reality.

Figure 4:
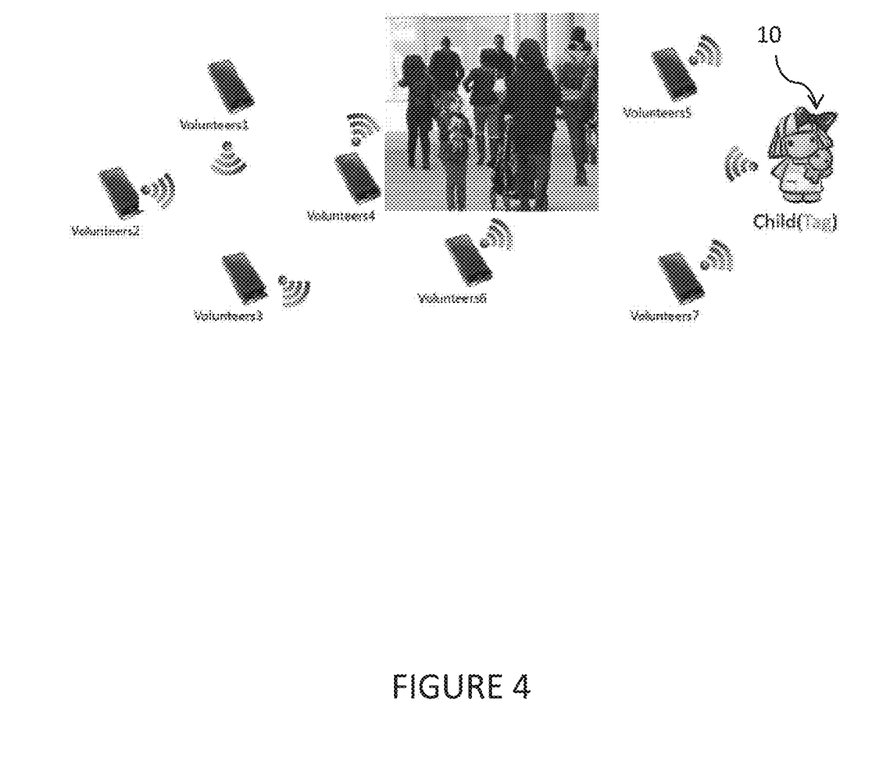
FIG. 4 shows a representation of numerous volunteers' smartphones participating in a lost item search.
Figure 5:
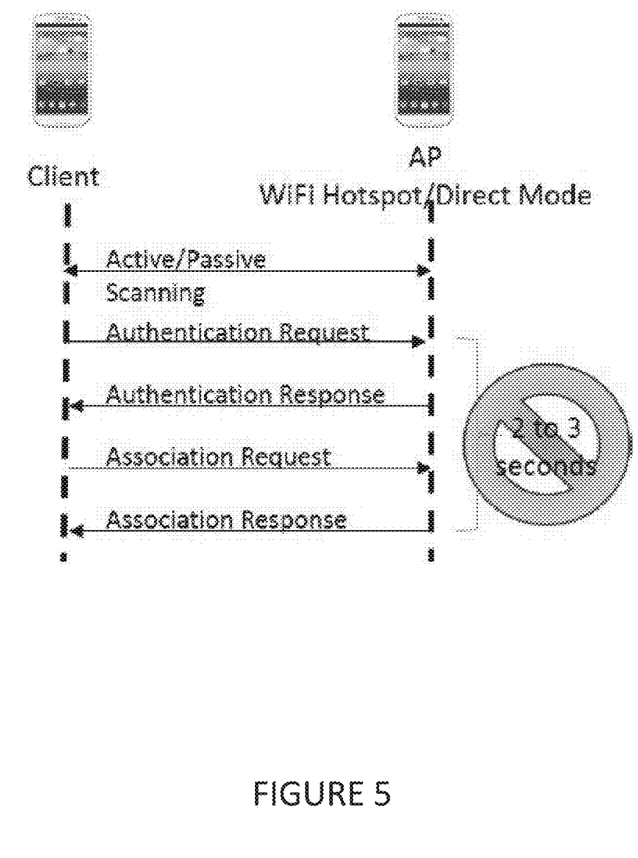
FIG. 5 shows the time delay disadvantages of using a conventional WiFi beacon structure.

Most people may be willing to support the availability of a child protection system. However, they may be reluctant to get actually involved in recovering a tagged missing child 10. For example, as illustrated in FIG. 4, although many volunteers would be willing to receive an Amber Alert via SMS, Google, and Facebook, it is not clear how many recipients are willing to actively be involved in recovering a missing tagged child 10, especially if the system or application interrupts the volunteer's ongoing tasks, costs volunteer's personal resources significantly, and risks one's privacy and security. Likewise, if the sensing application on a volunteer's smartphone consumes significant energy in addition to interruptions of users' ongoing tasks, it would be hard to recruit and incentivize large active crowd participants.

The present invention tackles the practical technical challenges for building a practical crowd sensing system through the use of an opportunistic crowd sensing (OCS) system. The OCS system enhances the effectiveness of detecting the tagged missing object 10 by using an innovative wireless communication mechanism, which minimizes the potential inconvenience or complexity of the crowd sensing participation by automating the sensing application, addresses the issue of energy efficiency, and ensures the privacy and security among the objects and participants.

The present invention employs a dynamic application enabling mechanism so that the application can be only enabled when a volunteer is needed in the geo-tracking task. Also, the application runs seamlessly without disrupting any existing functionalities. In practice, a volunteer does not need to know if the sensing application is enabled. Even if an application detects a tagged missing child 10, the application in the sensor can relay the information to a cloud server 40 (not shown) without letting the volunteer be aware of it. A volunteer only needs to install a sensing application once at the registration time. By minimizing the hassle of participation, the willingness of the involvement is increased.

To achieve a cost effective and practical safety means without requiring any special communication device, the system uses WiFi (WiFi Direct/Hotspot) [23, 24] enabled smartphones that are ubiquitous and the longest coverage among the existing direct communication mechanisms. However, the traditional WiFi mechanism cannot be used for a rapid communication among the moving objects due to the long association delay and insufficient coverage distance.

Figure 6:
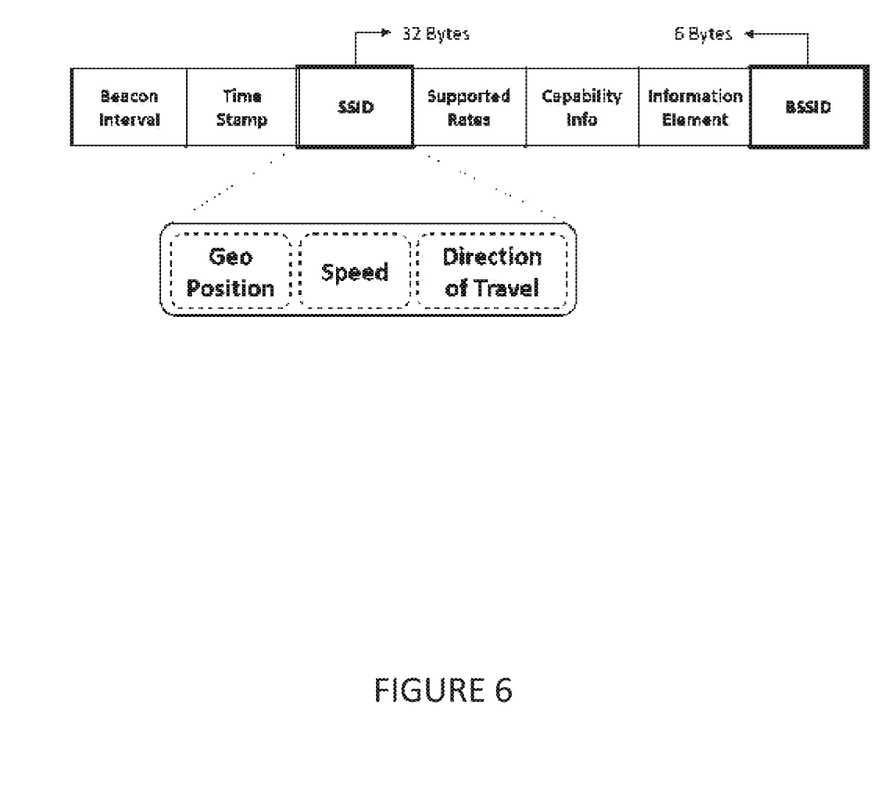
FIG. 6 shows a modified WiFi beacon structure having item of interest parameters inserted.

To enable a rapid communication between a missing object and volunteers, the present invention removes the 2 to 3 seconds of WiFi association overhead by using an innovative WiFi beacon stuffing mechanism [25, 26]. As shown in FIG. 6, the present invention embeds meaningful information such as object identification and characteristics in the Service Set Identifier (SSID) and Basic Service Set Identifier (BSSID) of a WiFi beacon frame that comprises 32 bytes and 6 bytes, respectively, containing a human readable identifier of the network. In the present invention, the beacon frame, which is a type of management frame providing the "heartbeat" of a wireless device, is used to geo-fence and geo-track tagged persons or objects. The identity of a tagged child, for example, and supplementary information will be encoded and embedded by the present invention by stuffing this information into a beacon frame. The system, termed a "geo-fencing" mechanism, looks for the occurrence of a weakening tag "heartbeat" from a certain tagged child. The geo-tracking mechanism searches the specific "heartbeat" signal from a missing tagged child.

Figure 7:
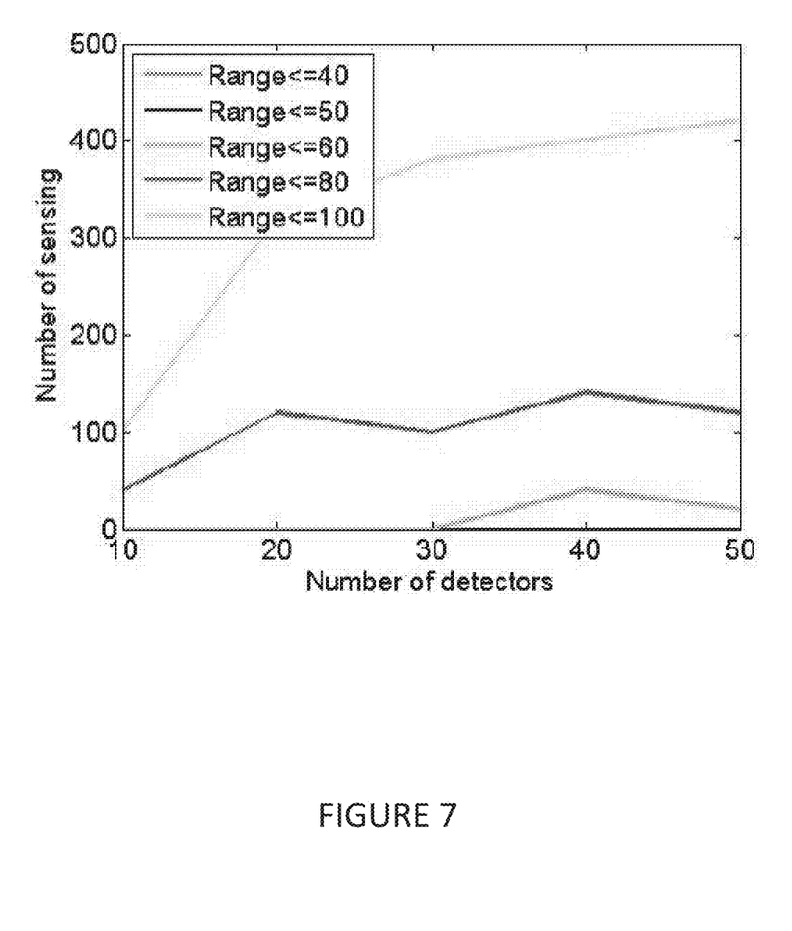
FIG. 7 shows the effect of increasing the number of detectors and the item of interests' mobility and distance on detection.
Figure 8:
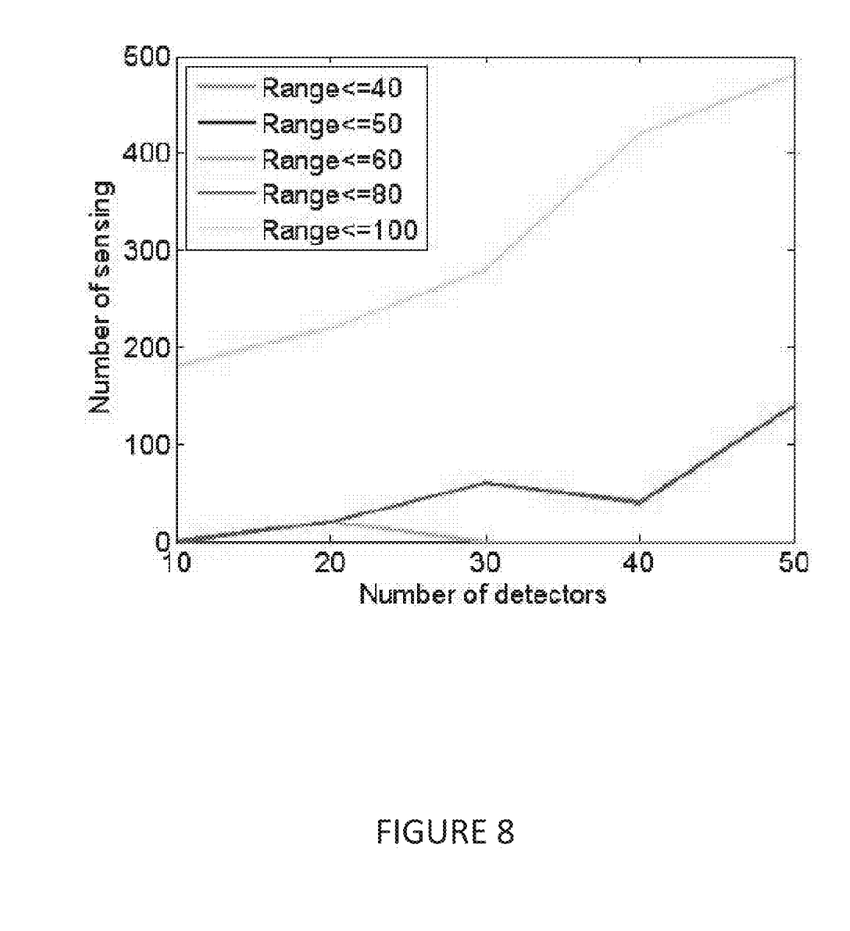
FIG. 8 shows the effect of increasing the number of detectors and the item of interests' mobility and distance on detection.

One may think of using Bluetooth rather than WiFi for energy efficiency. However, the effectiveness of sensing coverage of WiFi is significantly better than Bluetooth especially under a mobile sensing environment. To verify the impact of the wireless communication coverage range against the mobility of both target and detectors, a target sensing simulation was performed by varying the number of detectors (10, 20, 30, 40, and 50) and the distance of sensing ranging from 40 to 100 meters. A Random Waypoint mobility model in a speed range randomly selected between 0.2 mps and 3.2 mps was assumed. As shown in FIG. 7 and FIG. 8, the detection of a moving target that is sensed by any detector is improved by increasing the number of detectors, speeding up the target's mobility, and increasing the sensing range. Particularly, it is clear that the longer distance the sensing range is, the better the sensing result becomes. In the present invention, the effectiveness of sensing is improved by using WiFi (direct) that is ubiquitous and that has the longest coverage among the existing direct communication mechanisms.

The present invention also addresses the important and practical issues of power usage and message congestion that are caused by the periodic beacon message broadcast. When the WiFi signal becomes prevalent, (although WiFi provides several temporal, special, and frequency isolation methods for mitigating the potential interference), there could be a chance of a beacon collision due to hidden nodes, periodic delivery, and broadcast.

Figure 9:
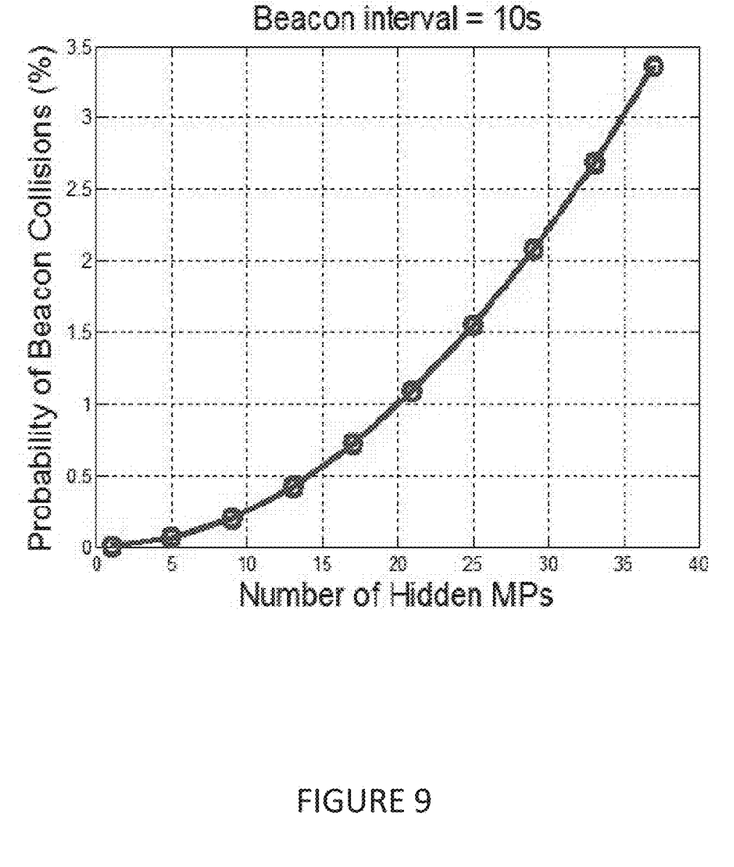
FIG. 9 shows the effect of beacon interval on the probability of beacon collision.
Figure 10:
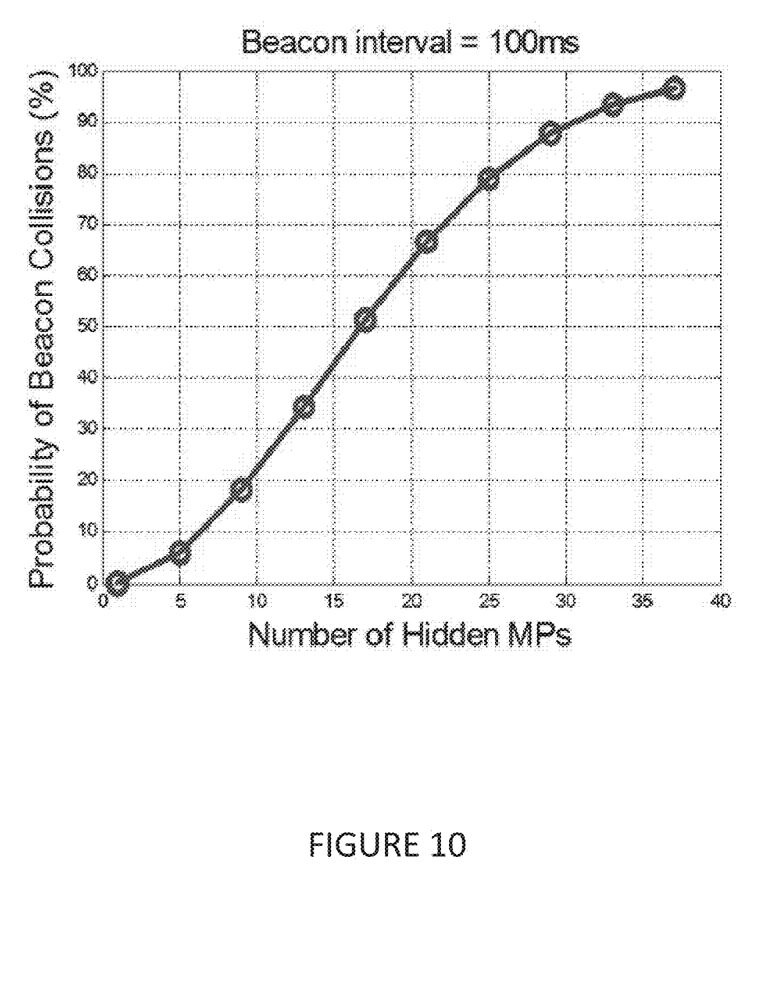
FIG. 10 shows the effect of beacon interval on the probability of beacon collision.

There are a few theoretical studies of analyzing the WiFi beacon collision probability in mesh networks [27]. These studies modeled the beacon collision problem approximately as the birthday paradox [28] to gain some intuition regarding the beacon collision problem. As presented in FIG. 9, the beacon collision probability is small, 3.5% for 35 nodes, when the beacon interval is 10 seconds. However, as shown in FIG. 10, considering that the default beacon interval is 100 ms (short interval), the beacon collision probability can be high (100%) when there are many hidden nodes (35 nodes).

Figure 11:
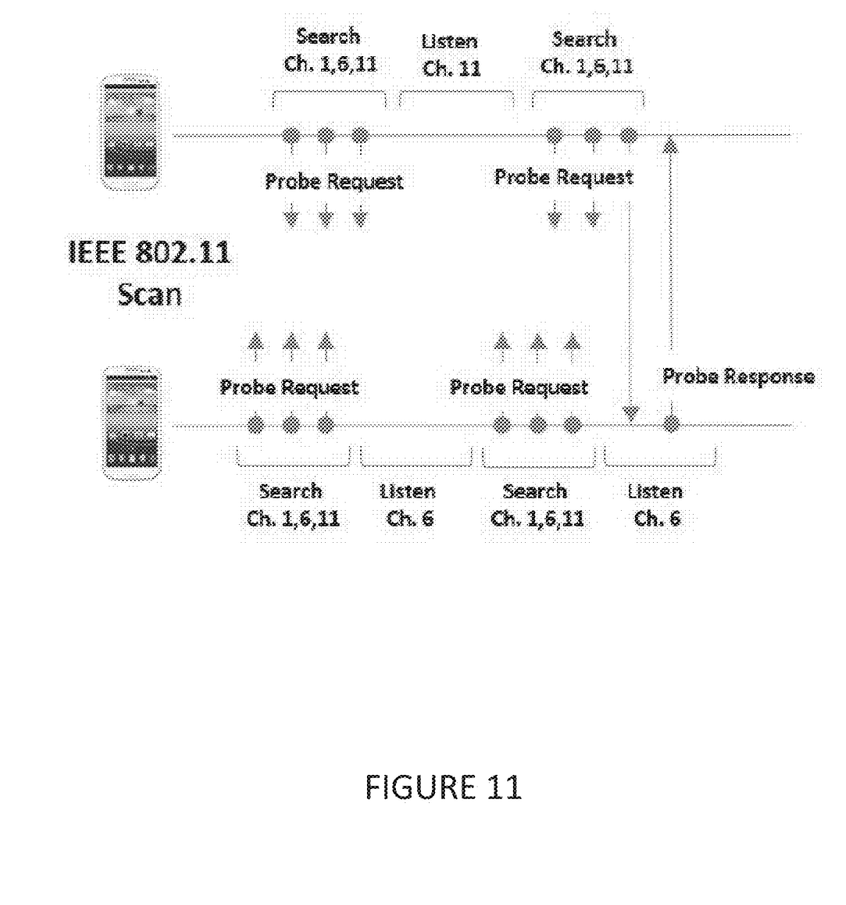
FIG. 11 shows the functioning of an IEEE 802.11 probe request and response.

The goal is to eliminate a periodic beacon by using specific SSID based WiFi 'probe request' and 'probe response' mechanisms. Referring to FIG. 11, an 802.11 probe request or response frame format is similar to a WiFi beacon frame format. However, the probe response is only sent in response to a probe request and the probe responses don't carry the Traffic Indication Map (TIM) [29] that identifies stations using a power saving mode. For example, WiFi Direct that enables devices to connect with each other without requiring a wireless access point [23] uses a probe request and response for the peer discovery. When a station searches a peer WiFi Direct station, it continues to send probe request frames (with an SSID named "DIRECT") and to listen for a while. When another WiFi Direct station receives a probe request, it triggers a probe response. Instead of configuring a missing object/tag to send periodic WiFi beacon frames, the present invention enables a listening mode for a missing object/tag that only responds upon a probe request. For example, in the case of a geo-fencing application, when a caregiver sends a probe request, all the tags within the range will send back probe responses.

In the case of a missing child geo-tracking application, the volunteers periodically send a probe request that triggers probe responses from the tags in the range. If a specific identity of a tagged missing child is found from the probe responses, the information will be relayed to the cloud server. To further reduce the beacon messages, the volunteers can specify a specific SSID (the identity of a missing child), when they send probe requests. It triggers only one probe response from a tag with the matching identity. For example, in case of a geo-fencing application, if the number of children in a group is high, a caregiver's probe request may trigger many concurrent probe responses. However, using a specific SSID based probe request, a caregiver can send a probe request to each individual tag to avoid any concurrent probe responses. This opportunistic trigger mechanism reduces the amount of beacon messages in the network as well as enhances power usage in each tag.

What is claimed is:

1. A tracking system, comprising:
   a radio frequency emitter collocated with an object to be tracked;
   at least one first personal communications device having a first software application which runs in the background;
   at least one second personal communications device having a second software application;
   a computer server having a third software application capable of bidirectional communication with the first personal communications device and the second at least one personal communications devices;
   a geo-tracking function of the third software application which sends a geo-tracking service request to the at least one first and second personal communications devices, causing the first and said second personal communications devices to send a probe request that triggers a probe response from the radio frequency emitter in a sensing distance of a range from 40 to 100 meters;
   wherein either of the at least one first or second personal communications device surreptitiously uploads its own location to the server upon reception of an emission from the radio frequency emitter;
   when the at least one first personal communications device fails to receive an emission from the radio frequency emitter, the at least one first personal communications device uploads an alert message to the server whereupon the server broadcasts a signal that activates the second software application;
   upon activation of the second software application the at least one second personal communications device surreptitiously uploads its own location to the server upon reception of an emission from the radio frequency emitter; and
   wherein the third software application logs the uploaded locations from first and the second at least one personal communications devices.

2. The tracking system of claim 1, wherein the first and the second personal communications devices are smartphones.

3. A method for detecting and tracking an object co-locating a radio frequency emitter with the object to be detected and tracked configuring computer-implementable instructions in a first software application so as to cause at least one first personal communications device to upload its location to a computer server configuring computer-implementable instructions in a second software application so as to cause at least one second personal communications device to upload its location to a computer server;

configuring computer-implementable instructions in a third software application to cause a computer server to perform bidirectional communications with the first and the second at least one personal communications devices;

a geo-tracking function of the third software application which sends a geo-tracking service request to the at least one first and second personal communications devices, causing the first and said second personal communications devices to send a probe request that triggers a probe response from the radio frequency emitter in a sensing distance of a range from 40 to 100 meters;

further configuring computer-implementable instructions in the first and the second software applications to cause either of the at least one first or second personal communications device to surreptitiously upload their location to the computer server upon reception of an emission from the radio frequency emitter;

further configuring the computer-implementable instructions in the first software application to upload an alert message to the computer server when the at least one first personal communications device fails to receive an emission from the radio frequency emitter;

further configuring the computer-implementable instructions in the third software application to cause the computer server to broadcast a signal that activates the second software application upon reception of the alert message; further configuring the second software application to surreptitiously upload the location of the at least one second personal communications device to the computer server upon activation of the second software application; and further configuring the third software application to cause the computer server to log the uploaded locations of the first and the second at least one personal communications devices.

4. The method for detecting and tracking an object of claim 3, wherein the personal communications devices are smartphones.

\* \* \* \* \*